United States Patent
Buergel

(10) Patent No.: US 9,463,449 B2
(45) Date of Patent: Oct. 11, 2016

(54) ACCELERATOR MIXTURE FOR PEROXIDE HARDENER AND TWO-COMPONENT MORTAR SYSTEM CONTAINING SAME

(75) Inventor: Thomas Buergel, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 997 days.

(21) Appl. No.: 13/457,261

(22) Filed: Apr. 26, 2012

(65) Prior Publication Data

US 2013/0112432 A1    May 9, 2013

(30) Foreign Application Priority Data

Apr. 27, 2011 (DE) .................. 10 2011 017 619

(51) Int. Cl.

| | |
|---|---|
| C04B 26/02 | (2006.01) |
| B01J 31/02 | (2006.01) |
| C04B 24/12 | (2006.01) |
| C04B 40/00 | (2006.01) |
| E21B 23/00 | (2006.01) |
| C04B 111/00 | (2006.01) |

(52) U.S. Cl.
CPC .......... *B01J 31/0237* (2013.01); *C04B 24/121* (2013.01); *C04B 24/122* (2013.01); *C04B 26/02* (2013.01); *C04B 40/0039* (2013.01); *E21B 23/00* (2013.01); *C04B 2111/00715* (2013.01)

(58) Field of Classification Search
CPC ... C04B 24/121; C04B 24/24; C04B 24/122; C04B 26/02
USPC ...................... 524/4, 650; 523/130
See application file for complete search history.

(56) References Cited

U.S. PATENT DOCUMENTS

| | | |
|---|---|---|
| 3,297,745 A | 1/1967 | Fekete et al. |
| 3,772,404 A | 11/1973 | Knight et al. |
| 4,618,658 A | 10/1986 | Hefner, Jr. et al. |
| 5,854,305 A | 12/1998 | Schwiegk et al. |
| 2004/0143051 A1 | 7/2004 | Lou et al. |
| 2006/0045630 A1* | 3/2006 | Buergel et al. ............ 405/259.6 |
| 2008/0171807 A1* | 7/2008 | Kumru .................. C04B 26/06 523/130 |
| 2009/0281258 A1 | 11/2009 | Kuang |
| 2009/0308533 A1 | 12/2009 | Grün et al. |
| 2011/0071234 A1 | 3/2011 | Gross et al. |

FOREIGN PATENT DOCUMENTS

| | | |
|---|---|---|
| CA | 1 265 895 A | 2/1990 |
| CN | 1418909 | * 5/2003 |
| CN | 1418909 A | 5/2003 |
| CN | 1517405 A | 8/2004 |
| CN | 101343520 A | 1/2009 |
| CN | 101412603 A | 4/2009 |
| CN | 101415762 A | 4/2009 |
| CN | 101468893 A | 7/2009 |
| CN | 101897650 A | 12/2010 |
| DE | 37 44 390 A1 | 7/1989 |
| DE | 41 31 457 A1 | 3/1993 |
| DE | 42 31 161 A1 | 3/1994 |
| DE | 195 31 649 A1 | 3/1997 |
| DE | 199 56 509 A1 | 1/2001 |
| DE | 10 2006 030 044 A1 | 1/2008 |
| DE | 10 2010 051 818 B3 | 2/2012 |
| EP | 1 935 860 A2 | 6/2008 |
| GB | 2217722 A | 11/1989 |
| WO | WO 2010/108939 A1 | 9/2010 |
| WO | WO 2012/065878 A1 | 5/2012 |

OTHER PUBLICATIONS

M. Malik, V. Choudhary, and I. K. Varma, "Current Status of Unsaturated Polyester Resins" J. Macromol. Sci., Rev. Macromol. Chem . Phys. C40, (2000), p. 139-165.

Japanese Office Action dated Mar. 11, 2015, with English translation (Five (5) pages).

Chinese Office Action dated May 5, 2015 with English-language translation (nineteen (19) pages).

Chinese Office Action issued in counterpart Chinese Application No. 201210122271.5 dated Jun. 8, 2016 with English-language translation (seven (7) pages).

Russian-language Office Action issued in counterpart Russian Application No. 2012116841 dated Apr. 12, 2016 (four (4) pages).

* cited by examiner

*Primary Examiner* — Edward Cain
(74) *Attorney, Agent, or Firm* — Crowell & Moring LLP

(57) ABSTRACT

An accelerator mixture for peroxide hardeners, in particular an accelerator mixture for an organic peroxide-curing resin mixture, a two-component mortar system containing the same for chemical fastening and use of the same for chemical fastening of anchoring elements in boreholes are disclosed. Using a mixture of bis-N-substituted p-toluidines with bis-N-substituted anilines or bis-N-substituted m-toluidines, it is possible to provide a mortar composition for chemical fastening of anchoring elements in boreholes, which will have an improved low-temperature curing and improved load ratings at high temperatures with an extended gel time.

18 Claims, No Drawings

US 9,463,449 B2

ACCELERATOR MIXTURE FOR PEROXIDE HARDENER AND TWO-COMPONENT MORTAR SYSTEM CONTAINING SAME

This application claims the priority of German Patent Document No. 10 2011 017 619.5, filed April 27, 2011, the disclosure of which is expressly incorporated by reference herein.

BACKGROUND AND SUMMARY OF THE INVENTION

The present invention relates to an accelerator mixture for organic peroxide hardeners, in particular an accelerator mixture for a diacyl peroxide curing resin mixture, a resin mixture containing the accelerator mixture and use thereof in two-component mortar systems for chemical fastening. Furthermore, the invention relates to the use of the two-component mortar system for chemical fastening in particular for chemical fastening of the anchoring means in boreholes.

Chemical mortar compositions based on radically polymerizable compounds have been known for a long time. These mortar compositions are used in two-component systems which are usually composed of a reactive resin mortar (component A) and a hardener (component B). Two-component systems with an organic binder based on radically polymerizable compounds containing a diacyl peroxide, in particular dibenzoyl peroxide as the curing agent are known from the state of the art. These systems contain a resin mixture based on radically polymerizable compounds, a compound capable of accelerating the polymerization reaction, serving to accelerate the formation of the radical initiator, and a compound capable of inhibiting the polymerization reaction, serving to delay the polymerization reaction. It is thus possible to adjust the gel time of the mortar composition in a targeted manner in accordance with the requirements of the mortar composition.

Aromatic amines, in particular substituted anilines and toluidines, which are frequently referred to as accelerators, are often used as the compounds capable of accelerating the polymerization reaction.

Mortar compositions accelerated with substituted anilines still have satisfactory load ratings at high temperatures (+40° C.) even after hardening, but they result in inferior hardening at low temperatures. It has thus been found that mortar accelerated with N,N-diethylaniline still has good load ratings at +40° C. after hardening, but at the same time, the load ratings of the fully hardened compounds drop in low-temperature applications (−10° C.).

Accordingly, it has been proposed that the anilines might be replaced by N-substituted p-toluidines, which are much more active, in particular at low temperatures, and are more robust so that N-substituted p-toluidines such as N,N-bis(2-hydroxypropyl)-p-toluidine are generally used today as accelerators for chemical mortars hardened with organic peroxides.

Gel times of 5 to 6 minutes are usually set today with chemical mortars based on methacrylates, for example. If the gel time is to be extended to approx. 8 to 10 minutes, the system must be inhibited to a greater extent. This is of interest in particular with regard to the proccessability of the mortar compositions at high temperatures and for use with subsequent rebar connections. However, the efficiency of the cured compounds drops drastically if the inhibition is too great, especially at high ambient temperatures, i.e., there is a decline in the load ratings.

On the basis of observations by the inventor, it was expected that if one combined the known accelerators based on aromatic amines from the state of the art, in particular based on toluidines and anilines for the different application temperatures, mortar compositions would be obtained that do not ensure satisfactory curing over a wide temperature range, in particular in the temperature range from −40° C. to +80° C., nor do they supply satisfactory load ratings of the fully cured compounds at the same time. This is against the background that m-toluidines or anilines have a positive influence on the high-temperature properties but have a negative influence on the low-temperature properties, while p-toluidine accordingly has a positive influence on the low-temperature properties but a negative influence on the high-temperature properties.

Thus, there is a demand for a system with which it will be possible to lengthen the gel time without having a negative influence on the properties of the system such as the curing, in particular at low temperatures and the low values of the fully cured compound, in particular at high temperatures, and thus to maintain the properties over the entire temperature range from −10° C. to +40° C.

The object of the present invention is therefore to provide an accelerator for hardeners based on organic peroxides as the curing agent, in particular based on diacyl peroxides for use in two-component mortar systems that will permit an extended gel time without having the negative effects of the accelerators known from the state of the art, such as moderate curing at low temperatures and low load ratings of the fully cured composition at high temperatures. The present invention should also make available a resin mixture that can be cured with organic peroxides, in particular diacyl peroxides, and has an extended gel time with good curing properties at high load ratings over a wide temperature range (−10° to +40° C.) at the same time.

It has now surprisingly been found that the object on which the present invention is based can be achieved by using a mixture of a bis-N-substituted p-toluidine (main accelerator) and a bis-N-substituted aniline or a bis-N-substituted m-toluidine (co-accelerator) as the accelerator in a two-component mortar system of the type defined in the introduction.

It has surprisingly been found that the load ratings, which drop as the gel time is extended, are actually significantly improved by adding a co-accelerator, which by itself allows only very moderate load ratings.

The following definitions are used in the sense of the present invention.

A "resin mixture" is a mixture of the reaction mixture of resin production (basic resin) containing the radically polymerizable compound, a catalyst for production of the compound and a reactive diluent, and accelerators as well as stabilizers and optionally additional reactive diluents; this term is used as equivalent to the term "organic binder".

A "reactive resin mortar" is a mixture of a resin mixture and inorganic additives; the term "resin component or component A" is used as equivalent to this.

"Curing agents" are substances that induce polymerization (curing) of the basic resin.

A "hardener" is a mixture of curing agents, inhibitors, optionally inert solvents and inorganic additives; the term "hardener or component B" is used as equivalent to this.

"Accelerators" are substances which accelerate polymerization (curing).

"Reactive diluents" are liquid or low-viscosity, radically polymerizable compounds, which dilute the resin mixture and thereby impart the viscosity required for their application; they contain functional groups capable of reacting with the basic resin and are part of the cured compound (mortar) in polymerization (curing) for the most part.

"Mortar composition" refers to the formulation obtained by mixing the reactive resin mortar with the hardener, which contains the curing agent and can be used directly as such for chemical fastening.

"Two-component mortar system" refers to a system which includes component A, the reactive resin mortar and a component B, the hardener, such that the two components are stored separately from one another to inhibit the reaction, so that curing of the reactive resin mortar occurs only after the components have been mixed.

The subject matter of the invention is therefore an accelerator mixture. Additional subject matters of the invention relate to a resin mixture containing the accelerator mixture, a reactive resin mortar containing the same, a two-component mortar system, as well as the use of the same for chemical fastening. The corresponding dependent claims relate to preferred specific embodiments of these subjects according to the invention.

With the accelerator mixture according to the invention, it is possible to lengthen the gel time of mortar compositions based on compounds that can be cured with organic peroxides, in particular diacyl peroxides, without having a negative influence on their properties. In the mortar compositions according to the invention, the accelerator mixture ensures a better curing behavior, in particular better low-temperature curing (−10° C.) at high load ratings at the same time, in particular at higher temperatures (+40° C.) than with the systems known in the past.

According to the invention, the accelerator mixture contains a main accelerator (I) and a co-accelerator (II), wherein the main accelerator (I) is a compound of formula (I)

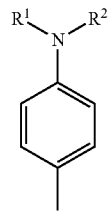

(I)

and the co-accelerator (II) is a compound of formula (II-1) or (II-2)

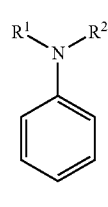

(II-1)

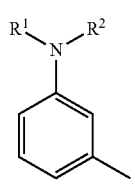

(II-2)

in each of which $R^1$ and $R^2$, independently of one another, denote a $C_1$ or $C_2$ alkyl group, a $C_1$-$C_3$ hydroxyalkyl group or a mono- or polyethoxylated or propoxylated $C_1$-$C_3$ hydroxyalkyl group.

The main accelerator (I) is preferably a compound of formula (I), in which $R^1$ and $R^2$, independently of one another, denote a $C_1$-$C_3$ hydroxyalkyl group, i.e., a hydroxymethyl, hydroxyethyl or hydroxypropyl group. The main accelerator (I) is especially preferably N,N-bis(2-hydroxypropyl)-p-toluidine.

The co-accelerator (II) is preferably selected from N,N-diethylaniline, N,N-bis(2-hydroxyethyl)aniline, N-ethyl-N-hydroxyethylaniline, N,N-bis(2-hydroxyethyl)-m-toluidine and N,N-bis(2-hydroxypropyl)-m-toluidine, where N,N-bis(2-hydroxyethyl)-m-toluidine is especially preferred.

A mixture of (I) N,N-bis(2-hydroxypropyl)-p-toluidine and (II) N,N-bis(2-hydroxyethyl)-m-toluidine is especially preferred as the accelerator according to the invention.

The main accelerator and the co-accelerator are used in a I:II molar ratio of 1:1 to 5:1, preferably 3:2 to 4:1, and especially preferably 3:1 according to the invention. At a ratio greater than 5:1, an effect of the co-accelerator is no longer observed, so that the curing property is determined substantially by the main accelerator at low temperatures and the load ratings are determined substantially by the main accelerator at high temperatures. Then good low-temperature curing is observed, but the load ratings of the compound cured in this way suffer, so that load ratings drop at high temperatures (+40° C.).

Another subject matter of the present invention is a resin mixture comprising at least one radically polymerizable compound, an accelerator for the curing agent and optionally at least one inhibitor and at least one reactive diluent, which is characterized in that the accelerator is an accelerator mixture containing a main accelerator (I) and a co-accelerator (II), such that the main accelerator (I) is a compound of formula (I)

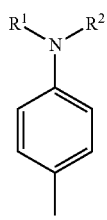

(I)

and the co-accelerator (II) is a compound of the formula (II-1) or (II-2)

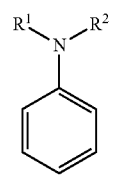

(II-1)

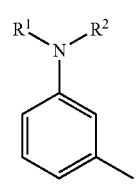

(II-2)

in which $R^1$ and $R^2$, independently of one another, each denotes a $C_1$ or $C_2$ alkyl group, a $C_1$-$C_3$ hydroxyalkyl group or a mono- or polyethoxylated or propoxylated $C_1$-$C_3$ hydroxyalkyl group.

With respect to a more precise description of the accelerator mixture, reference is made to the preceding discussion.

According to the invention, the accelerator mixture is present in an amount of 1.0 to 3.0 wt %, preferably from 1.3 to 2.6 wt % and most preferably from 1.7 to 2.3 wt %, based on the resin mixture.

In addition to the accelerator mixture described above, the resin mixture may also contain additional accelerators such as the salts of cobalt (e.g., cobalt octoate, cobalt naphthenate), manganese, tin, vanadium (e.g., vanadium(IV) acetylacetonate, vanadium (V) acetylacetonate) or cerium.

Suitable radically polymerizable compounds according to the invention include ethylenically unsaturated compounds, cyclic monomers, compounds with carbon-carbon triple bonds and thiol-yne/ene resins such as those with which those skilled in the art are familiar.

Of these compounds, the group of ethylenically unsaturated compounds is preferred, comprising styrene and derivatives thereof, (meth)acrylates, vinyl esters, unsaturated polyesters, vinyl ethers, allyl ethers, itaconates, dicyclopentadiene compounds and unsaturated fats, of which the unsaturated polyester resins and vinyl ester resins in particular are suitable and are described in the patent documents EP 1 935 860 A1, DE 195 31 649 A1 and WO 10/108939 A1, for example. Vinyl ester resins are the most preferred because of their hydrolytic stability and excellent mechanical properties.

Examples of suitable unsaturated polyesters which may be used in the resin mixture according to the invention are divided into the following categories, as classified by M. Malik et al. in J. M. S.—Rev. Macromol. Chem. Phys., C40 (2 and 3), pp. 139-165 (2000):

(1) Ortho resins: These are based on phthalic anhydride, maleic anhydride or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol A;

(2) Iso resins: These are synthesized from isophthalic acid, maleic anhydride or fumaric acid and glycols. These resins may contain larger amounts of reactive diluents than the ortho resins;

(3) Bisphenol A fumarates: These are based on ethoxylated bisphenol A and fumaric acid; and (4) HET acid resins (hexachloro-endo-methylene tetrahydrophthalic acid resins): These are resins obtained from anhydrides or phenols containing chlorine/bromine in the synthesis of unsaturated polyester resins.

In addition to these resin classes, the so-called dicyclopentadiene resins (DCPD resins) may also be differentiated as unsaturated polyester resins. The class of DCPD resins is obtained either by modification of one of the aforementioned types of resins by Diels-Alder reaction with cyclopentadiene or alternatively they may be obtained by a first reaction of a diacid, e.g., maleic acid with dicyclopentadienyl and then by a second reaction, the usual synthesis of an unsaturated polyester resin, such that the latter refers to a DCPD-maleate resin.

The unsaturated polyester resin preferably has a molecular weight Mn in the range of 500 to 10,000 Dalton, more preferably in the range of 500 to 5000 and even more preferably in the range of 750 to 4000 (according to ISO 13885-1). The unsaturated polyester resin has an acid value in the range of 0 to 80 mg KOH/g resin, preferably in the range of 5 to 70 mg KOH/g resin (according to ISO 2114-2000). If a DCPD resin is used as the unsaturated polyester resin, then the acid value preferably amounts to 0 to 50 mg KOH/g resin.

In the sense of the invention, vinyl ester resins are oligomers or polymers with at least one (meth)acrylate terminal group, so-called methacrylate functionalized resins, which also include urethane (meth)acrylate resins and epoxy (meth)acrylates.

Vinyl ester resins having unsaturated groups only in a terminal position are obtained, for example, by reacting epoxy oligomers or polymers (e.g., bisphenol A diglycidyl ethers, epoxies of the phenol-novolak type or epoxy oligomers based on tetrabromobisphenol A) with, for example, (meth)acrylic acid or (meth)acrylamide. Preferred vinyl ester resins include methacrylate-functionalized resins and resins obtained by reacting an epoxy oligomer or polymer with methacrylic acid or methacrylamide, preferably with methacrylic acid. Examples of such compounds are disclosed in the patent documents U.S. Pat. No. 3,297,745 A, U.S. Pat. No. 3,772,404 A, U.S. Pat. No. 4,618,658 A, GB 2,217,722 A1, DE 37 44 390 A1 and DE 41 31 457 A1.

In this context, reference is made to the US patent application US 2011/071234 AA, the disclosure of which is incorporated by reference herein in the present patent application.

The vinyl ester resin preferably has a molecular weight Mn in the range of 500 to 3000 Dalton, more preferably 500 to 1500 Dalton (according to ISO 13885-1). The vinyl ester resin has an acid value in the range of 0 to 50 mg KOH/g resin, preferably in the range of 0 to 30 mg KOH/g resin (according to ISO 2114-2000).

Ethoxylated bisphenol A di(meth)acrylate with a degree of ethoxylation of 2 to 10, preferably 2 to 4, difunctional, trifunctional or higher functional urethane-(meth)acrylate oligomers or mixtures of these curable components are especially suitable as the vinyl ester resin.

All these resins, which may be used according to the invention, may be modified by methods with which those skilled in the art are familiar to achieve, for example, lower acid numbers, hydroxyl numbers or anhydride numbers or they can be made more flexible by the introduction of flexible units into the basic structure and the like.

In addition, the resin may also contain other reactive groups which can be polymerized with a radical initiator such as peroxides, for example, reactive groups derived from itaconic acid, citraconic acid and allylic groups and the like, such as those described in WO 2010/108939 A1 (itaconic acid esters), for example.

The radically polymerizable compound is present in an amount of 10 to 30 wt %, preferably 10 to 20 wt %, based on the resin mixture.

In a preferred embodiment of the invention, the resin mixture also contains additional low-viscosity, radically polymerizable compounds as reactive diluents to adapt the viscosity of the radically polymerizable compound which functions as the resin, if necessary. The reactive diluents may be added in an amount of 20 to 70 wt %, preferably 30 to 70 wt %, especially preferably 50 to 70 wt %, based on the resin mixture.

Suitable reactive diluents are described in EP 1 935 860 A1 and DE 195 31 649 A1. The resin component A preferably contains as comonomer (c) a (meth)acrylic acid ester, where (meth)acrylic acid esters are especially preferably selected from the group consisting of hydroxypropyl (meth)acrylate, butanediol 1,2-di(meth)acrylate, trimethylolpropane tri(meth)acrylate, 2-ethylhexyl (meth)acrylate, phenylethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, 1,4-butanediol (meth)acrylate, acetoacetoxyethyl (meth)

acrylate, 1,2-ethanediol di(meth)acrylate, isobornyl (meth) acrylate, diethylene glycol di(meth)acrylate, methoxypolyethylene glycol mono(meth)acrylate, trimethylcyclohexyl (meth)acrylate, 2-hydroxyethyl (meth)acrylate, dicyclopentenyloxyethyl (meth)acrylate, and/or tricyclopentadienyl di(meth)acrylate, bisphenol A (meth)acrylate, novolak epoxy di(meth)acrylate, di-[(meth)acryloylmaleoyl]tricycle-5.2.1.0.$^{2.6}$-decane, dicyclopentenyloxyethyl crotonate, 3-(meth)acryloyloxymethyltricyclo-5.2.1.0.$^{2.6}$-decane, 3-(meth)cyclopentadienyl (meth)acrylate, isobornyl (meth) acrylate and decalyl-2-(meth)acrylate.

Essentially any other conventional radically polymerizable compounds may also be used, either alone or in mixture with the (meth)acrylic acid esters, e.g., styrene, α-methylstyrene, alkylated styrenes such as tert-butylstyrene, divinylbenzene and allyl compounds.

The nomenclature used to identify the radically polymerizable compounds, e.g., "(meth)acryl" means that this term should comprise both "methacryl" compounds and "acryl" compounds.

In a preferred embodiment of the invention, the resin mixture also contains an inhibitor to adjust the gel time. Suitable inhibitors according to the invention are the inhibitors conventionally used for radically polymerizable compounds, such as those with which those skilled in the art are familiar. The inhibitors are preferably selected from phenolic compounds and nonphenolic compounds, such as stable radicals and/or phenothiazines.

Phenolic inhibitors, which are often components of commercial radically curing reactive resins, include phenols such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidene diphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, pyrocatechol and butyl pyrocatechol such as 4-tert-butylpyrocatechol, 4,6-di-tert-butylpyrocatechol, hydroquinones such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone or mixtures of two or more thereof.

Nonphenolic or anaerobic inhibitors, i.e., those which are effective even without oxygen in contrast with phenolic inhibitors preferably include phenothiazines, such as phenothiazine and/or derivatives or combinations thereof or stable organic radicals, such as galvinoxyl and N-oxyl radicals.

Examples of N-oxyl radicals that may be used are those described in DE 199 56 509. Suitable stable N-oxyl radicals (nitroxyl radicals) may be selected from 1-oxyl-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxylpiperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL hereinafter), aluminum N-nitrosophenylhydroxylamine, diethylhydroxylamine. Also suitable N-oxyl compounds include oximes such as acetaldoxime, acetone oxime, methyl ethyl ketoxime, salicyloxime, benzoxime, glyoxime, dimethylglyoxime, acetone-O-(benzyloxycarbonyl)oxime and the like.

These inhibitors may be used either alone or as a combination of two or more, depending on the desired properties of the resin compositions. The combination of phenolic and nonphenolic inhibitors permits a synergistic effect as also shown by the setting of an essentially drift-free setting of the gel time of the reactive resin formulation.

The inhibitor is preferably present in an amount of 0.01 to 0.5 wt %, preferably 0.03 to 0.35 wt %, based on the resin mixture.

Another subject matter of the present invention is a reactive resin mortar comprising the resin mixture described above and inorganic additives.

Inorganic additives that may be present in an inventive reactive resin mortar and/or the hardener include in particular thixotropy agents, thickeners, fillers and/or other additives.

Suitable thixotropy agents and thickeners are optionally pyrogenic silicic acid with an organic aftertreatment, silicates, laponite, bentonites, alkyl and methyl celluloses, castor oil derivatives, derivatized cellulose or the like.

Fillers that may be used include conventional fillers, preferably mineral or mineral-like fillers such as quartz, glass, sand, quartz sand, quartz powder, porcelain, corundum, ceramic, talc, silica (e.g., pyrogenic silica), silicates, clay, titanium dioxide, chalk, heavy spar, feldspar, basalt, aluminum hydroxide, granite or sandstone, polymer fillers such as thermosetting resins, hydraulically curing fillers such as plaster, slaked lime or cement (e.g., alumina cement or Portland cement), metals such as aluminum, carbon black and wood, mineral or organic fibers or the like or mixtures of two or more thereof which may be added in the form of a powder, granules or in the form of molded bodies. The fillers may be present in any desired forms, for example, as a powder or meal or as molded bodies, e.g., in the form of cylinders, rings, balls, flakes, rods, saddles or crystals or in fiber form (fibrillary fillers), and the corresponding basic particles preferably have a maximum diameter of 0.001 to 10 mm. However, the globular inert substances (spherical shape) are preferred and definitely have a reinforcing effect.

Other conceivable additives also include plasticizers, such as phthalic acid esters or sebacic acid esters, stabilizers, antistatic agents, flexibilizers, curing catalysts, rheology aids, wetting agents, coloring additives such as dyes or pigments in particular, for example, for different colorations of the components for better monitoring of their mixing or the like; mixtures of two or more thereof are also possible.

The resin mixture expediently constitutes 30 to 50 wt % of the reactive resin mortar, preferably approx. 40 wt %, and the additional additives constitute 50 to 70 wt %.

Another subject matter of the invention is a two-component mortar system comprising as component A the reactive resin mortar described above and a hardener as component B. The two-component mortar system contains as the curing agent an organic peroxide such as methyl ethyl ketone peroxide, tert-butyl perbenzoate, cyclohexanone peroxide, cumene hydroperoxide and/or tert-butylperoxy-2-ethylhexanoate or a diacyl peroxide preferably benzoyl peroxide or lauroyl peroxide, but a diacyl peroxide is preferred and benzoyl peroxide is especially preferred; this curing agent is contained in a spatially separate form and thus in reaction-inhibiting separation from the reactive resin mortar, i.e., the component containing the curable component. The curing agent is preferably present in a concentration of 0.5 to 3 wt %, preferably 1.5 to 2.5 wt %, based on the total amount of component A and B (the mortar composition).

Component B (hardener) of the two-component mortar system may also contain all the usual inorganic additives.

Component B (hardener) may also contain water and/or organic diluents (solvents) in an amount of up to 30 wt %, based on the mortar composition, for example, 1 to 20 wt % such as phthalic acid esters, higher valency alcohols and their ethoxylate or propoxylated and/or functionalized derivatives such as ethylene glycol, propylene glycol, glycerol, di-, tri-, etc. or polyethylene glycol as well as, for example, glycerol or PEG vinyl or allyl ether; in addition to serving to prepare a paste or emulsion, i.e., to adjust the rheological properties, these derivatives also serve as inhibitors in component B.

The peroxide is preferably present as an aqueous dispersion, with the water serving as an inhibitor.

In an especially preferred embodiment of the two-component mortar system, component A additionally contains a hydraulically setting or polycondensable inorganic compound in addition to the reactive resin mortar, and component B also contains water in addition to the curing agent. Such mortar compositions are described in detail in DE 42 31 161 A1, where the component A preferably contains cement, for example, Portland cement or aluminate cement as the hydraulically setting or polycondensable inorganic compound, wherein iron oxide-free or iron oxide-lean cements are especially preferred. Plaster as such or in mixture with the cement may be used as the hydraulically setting inorganic compound.

The two-component mortar system according to the invention is used in particular for chemically affixing anchoring elements such as anchors, reinforcing iron, screws and the like in boreholes, in particular in boreholes in various mineral substrates such as those based on concrete, porous concrete, brick, limestone, sandstone, natural rock and the like.

The two-component mortar system comprises component A and component B, which are kept separately in different containers, for example, in a multichamber device, such as a multichamber cartridge, from which containers the two components are expressed by the action of mechanical pressing forces or under the influence of a gas pressure and are mixed. Another possibility is to fabricate the two-component mortar system as two-component capsules which are introduced into the borehole and destroyed by rotational impact setting of the fastening element while at the same time mixing the two components of the mortar composition. A cartridge system or an injection system is preferably used, in which the two components are expressed from the separate containers and passed through a static mixer, in which they are mixed homogeneously and are then discharged through a nozzle, preferably directly into the borehole.

The great advantage of the present invention is that the gel time of a mortar composition based on radically polymerizable compounds which are hardened with peroxides can be set at approx. 8 to 10 minutes by using the accelerator mixture described here, and the mortar composition has a satisfactory low-temperature curing (−10° C.) and the fully cured compound has a satisfactory load rating at high temperature (+40° C.).

The following examples are presented to further illustrate the present invention.

EXEMPLARY EMBODIMENTS

The formulations of Comparative Examples 1 to 3 and Examples 1 to 3 are based on the basic compositions described below. The composition of the amine accelerator is given in Table 2.

To prepare component A, first the amine accelerator is dissolved in the methacrylate resin while heating. Then the inhibitor is added to the solution and the mixture is stirred until obtaining a homogeneous solution. Next the pyrogenic silica and the inorganic fillers together with a dissolver are dispersed in the resin solution under a vacuum until obtaining a homogeneous paste. The amounts (wt %) are each based on component A, unless otherwise indicated.

A dispersion of benzoyl peroxide in water is the starting mixture for the hardener for the methacrylate resin, the fillers being dispersed in this mixture, which is then thickened with the pyrogenic silica. The amounts (wt %) are each based on component B, unless otherwise indicated.

TABLE 1

| Component A | |
| --- | --- |
| Ingredient | Wt % |
| Urethane methacrylate prepolymer | 16.4 |
| Diethylene glycol dimethacrylate | 14.35 |
| Hydroxyethyl methacrylate | 10.25 |
| Amine accelerator* | 4.1 (mmol) |
| Pyrogenic silica | 3 |
| Quartz sand 0-0.7 mm | 41 |
| Portland cement | 15 |

*See Table 2

| Component B | |
| --- | --- |
| Ingredient | Wt % |
| Dibenzoyl peroxide | 7 |
| Water | 25 |
| Pyrogenic silica | 2.5 |
| Quartz powder | 64.5 |
| Phyllosilicate | 1 |

EXAMPLE 1

On the basis of the components listed in Table 1, a mortar composition was prepared, wherein 0.12 wt % pyrocatechol was added to component A as an inhibitor and 0.53 wt % bis-(2-hydroxyethyl)-p-toluidine (2.73 mmol) and 0.21 wt % diethylaniline (1.36 mmol) were added as amine accelerators to adjust the gel time. The molar mixing ratio of bis-(2-hydroxyethyl)-p-toluidine to diethylaniline was 2:1 accordingly.

EXAMPLE 2

On the basis of the components listed in Table 1, a mortar composition was prepared, wherein 0.13 wt % pyrocatechol was added to component A as an inhibitor and 0.60 wt % bis-(2-hydroxyethyl)-p-toluidine (3.08 mmol) and 0.25 wt % bis-(2-hydroxyethyl)-m-toluidine (1.03 mmol) were added as amine accelerators to adjust the gel time. The molar mixing ratio of bis-(2-hydroxyethyl)-p-toluidine to bis-(2-hydroxyethyl)-m-toluidine was 3:1 accordingly.

EXAMPLE 3

On the basis of the components listed in Table 1, a mortar composition was prepared wherein 0.11 wt % pyrocatechol was added to component A as an inhibitor and 0.41 wt % bis-(2-hydroxyethyl)-p-toluidine (2.05 mmol) and 0.42 wt % bis-(2-hydroxyethyl)-m-toluidine (2.05 mmol) were added as amine accelerators to adjust the gel time. The molar mixing ratio of bis-(2-hydroxyethyl)-p-toluidine to bis-(2-hydroxyethyl)-m-toluidine was 1:1 accordingly.

Comparative Example 1

On the basis of the components listed in Table 1, a mortar composition was prepared, wherein 0.15 wt % pyrocatechol was added to component A as an inhibitor and 0.80 wt % bis-(2-hydroxyethyl)-p-toluidine was added as the amine accelerator to adjust the gel time.

Comparative Example 2

On the basis of the components listed in Table 1, a mortar composition was prepared, wherein 0.07 wt % pyrocatechol was added to component A as an inhibitor and 0.62 wt % diethylaniline was added as the amine accelerator to adjust the gel time.

Comparative Example 3

On the basis of the components listed in Table 1, a mortar composition was prepared, wherein 0.06 wt % pyrocatechol was added to component A as an inhibitor and 0.96 wt % bis-(2-hydroxyethyl)-m-toluidine was added as the amine accelerator to adjust the gel time.

a) Determining the Gel Time

The gel time of the mixture of components A and B obtained in this way was determined using a commercial device (GELNORM® Gel Timer) at a temperature of 25° C. To do so, components A and B were mixed in a volume ratio of 3:1 and were thermally regulated at 25° C. in a silicone bath immediately after mixing, and then the temperature of the sample was measured. The sample itself was in test tube which was placed in an air blanket countersunk in a silicone bath for thermal regulation.

The heat evolved by the sample is plotted as a function of time. The analysis is performed according to DIN 16945, page 1 and DIN 16916. The gel time is the time after which a temperature rise of 10K is achieved, in this case from 25° C. to 35° C.

Table 2 shows the results of the gel time determination.

It is clear from this that gel time of the inventive compositions adjusted with the accelerator mixtures according to Examples 1, 2 and 3 are within the range of the compositions adjusted using inhibitors known from the state of the art at room temperature.

b) Determination of the Load Ratings

To determine the load ratings of the fully cured composition, a threaded anchor rod M12 is used and is plugged into a borehole in concrete with a diameter of 14 mm and a borehole depth of 72 mm with the two-component reactive resin according to the invention. The average failure load was determined by centrally extracting the threaded anchor rod with a tight support using high-strength threaded anchor rods. Three threaded anchor rods were plugged in place and their load ratings were determined after curing for 24 hours. The resulting load ratings are also listed in Table 2 below as mean values.

This shows clearly that the low load rating obtained in comparative example 1 is in the high temperature range (+40° C.) and the low load ratings obtained in Comparative Examples 2 and 3 in the low temperature range (−10° C.) could be raised significantly by the accelerator mixtures according to the invention without resulting in a decline in the load ratings in the other temperature ranges.

TABLE 2

Results of the determination of gel time and load rating

| | | Comparative Example 1 | Comparative Example 2 | Comparative Example 3 | Example 1 | Example 2 | Example 3 |
|---|---|---|---|---|---|---|---|
| Bis-(2-hydroxyethyl)-p-toluidine | wt % | 0.80 | | | 0.53 | 0.60 | 0.41 |
| Diethylaniline | wt % | | 0.62 | | 0.21 | | |
| Bis-(2-hydroxyethyl)-m-toluidine | wt % | | | 0.96 | | 0.25 | 0.47 |
| Mixing ratio | mol/mol | | | | 2:1 | 3:1 | 1:1 |
| Pyrocatechol | wt % | 0.15 | 0.07 | 0.06 | 0.12 | 0.13 | 0.11 |
| Gel time 25° C. | min | 06:40 | 06:10 | 06:15 | 07:20 | 06:55 | 06:40 |
| Load ratings (kN) M12*72 | Ref.[1] | 58.7 ± 1.1 | 63.4 ± 1.1 | 62.4 ± 2.4 | 61.2 ± 2.0 | 62.0 ± 2.3 | 61.0 ± 2.5 |
| | −10° C.[2] | 58.7 ± 3.9 | 40.4 ± 2.3 | 33.0 ± 4.4 | 55.8 ± 2.2 | 54.1 ± 0.9 | 50.3 ± 1.5 |
| | +40° C.[3] | 45.2 ± 3.1 | 56.3 ± 2.6 | 60.9 ± 3.2 | 58.1 ± 3.6 | 57.8 ± 3.2 | 57.5 ± 1.8 |

[1] dry cleaned borehole; setting and curing at room temperature (+25° C.)
[2] like [1] but setting and curing at −10° C.
[3] like [1] but setting and curing at +40° C.

These examples prove the surprising fact that with the accelerator mixtures according to the invention, it is possible to set gel times that are within the range of the gel times achieved with the accelerators known in the state of the art. Furthermore, it has been demonstrated that the use of the accelerator mixture according to the invention leads to much more stable properties over the temperature range −10° C. to 40° C. In particular, improved load ratings have been achieved in the low-temperature range (−10° C.) and in the high-temperature range (+40° C.) in comparison with the reference resin compositions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An accelerator mixture for peroxide-curing resin mixtures, comprising:

a main accelerator (I), and a co-accelerator (II), wherein the main accelerator (I) is a compound of formula (I)

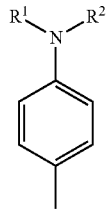
(I)

and the co-accelerator (II) is a compound of formula (II-1) or (II-2)

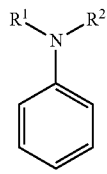
(II-1)

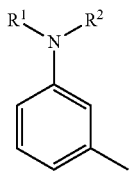
(II-2)

in which $R^1$ and $R^2$, independently of one another, denote a $C_1$ or $C_2$ alkyl group, a $C_1$-$C_3$ hydroxyalkyl group or a mono- or polyethoxylated or propoxylated $C_1$-$C_3$ hydroxyalkyl group, and the molar ratio of (I):(II) is between 1:1 and 5:1.

2. The accelerator mixture according to claim 1, wherein the main accelerator (I) is N,N-bis(2-hydroxyethyl)-p-toluidine, N,N-bis(2-hydroxypropyl)-p-toluidine or an ethoxylated or propoxylated derivative thereof.

3. The accelerator mixture according to claim 1, wherein the co-accelerator (II) is N,N-diethylaniline, N,N-bis(2-hydroxyethyl)aniline, N-ethyl-N-hydroxyethylaniline, N,N-bis(2-hydroxyethyl)-m-toluidine or N,N-bis(2-hydroxypropyl)-m-toluidine.

4. The accelerator mixture according to claim 3, wherein the main accelerator (I) is N,N-bis(2-hydroxypropyl)-p-toluidine and the co-accelerator (II) is N,N-bis(2-hydroxyethyl)-m-toluidine.

5. The accelerator mixture according to claim 1, wherein a molar ratio of the main accelerator (I) to the co-accelerator (II) is 3:1.

6. A resin mixture, comprising:
   a radically polymerizable compound;
   an accelerator according to claim 1; and
   optionally an inhibitor and a reactive diluent.

7. The resin mixture according to claim 6, wherein the main accelerator (I) is N,N-bis(2-hydroxypropyl)-p-toluidine and the co-accelerator (II) is N,N-bis(2-hydroxyethyl)-m-toluidine.

8. The resin mixture according to claim 6, wherein a molar ratio of the main accelerator (I) to the co-accelerator (II) is 3:1.

9. The resin mixture according to claim 6, wherein the accelerator is present in an amount of 1 to 3 wt % based on the resin mixture.

10. A reactive resin mortar comprising the resin mixture according to claim 6 and inorganic additives.

11. The reactive resin mortar according to claim 10, wherein the resin mixture is present in an amount of 30 to 50 wt % based on the reactive resin mortar.

12. The reactive resin mortar according to claim 10, wherein the inorganic additives are present in an amount of 50 to 70 wt % based on the reactive resin mortar.

13. A two-component mortar system, comprising:
    the reactive resin mortar according to claim 10; and
    a hardener, which contains an organic peroxide as a curing agent.

14. The two-component mortar system according to claim 13, wherein the organic peroxide is a diacyl peroxide.

15. The two-component mortar system according to claim 13, further comprising an inhibitor.

16. The two-component mortar system according to claim 13, wherein the hardener also contains inorganic additives.

17. The two-component mortar system according to claim 13, further comprising a hydraulically setting or polycondensable inorganic compound, and water.

18. A method for chemical fastening of an anchoring element in a borehole, comprising the steps of:
    placing the anchoring element in the borehole;
    fastening of the anchoring element in the borehole with the two-component mortar system according to claim 13.

* * * * *